(12) United States Patent
Thiel et al.

(10) Patent No.: US 7,829,800 B2
(45) Date of Patent: Nov. 9, 2010

(54) DEVICE AND METHOD FOR THE GRAVIMETRIC DETERMINATION OF LIQUID VOLUMES AND ANALYZER SYSTEM COMPRISING SUCH A DEVICE

(75) Inventors: Markus Thiel, Horgen (CH); Philipp Kull, Zurich (CH); Daniel Ott, Baar (CH); Joerg Burmester, Zurich (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 263 days.

(21) Appl. No.: 12/053,738

(22) Filed: Mar. 24, 2008

(65) Prior Publication Data
US 2008/0257039 A1  Oct. 23, 2008

(30) Foreign Application Priority Data
Mar. 30, 2007  (EP) .................... 07006664

(51) Int. Cl.
G01G 21/28 (2006.01)
G01F 23/20 (2006.01)
B01L 1/00 (2006.01)

(52) U.S. Cl. .......................... 177/180; 73/296; 422/100; 422/102; 422/104; 436/180

(58) Field of Classification Search .................... 73/296; 436/180; 422/100, 102, 104; 177/180
See application file for complete search history.

(56) References Cited

U.S. PATENT DOCUMENTS

| | | | | |
|---|---|---|---|---|
| 5,061,639 A * | 10/1991 | Lung et al. | .................. | 436/164 |
| 5,879,944 A * | 3/1999 | Komatsu | ..................... | 436/50 |
| 6,387,330 B1 * | 5/2002 | Bova et al. | .................. | 422/100 |
| 6,455,787 B1 * | 9/2002 | Ingenhoven | ................ | 177/50 |
| 6,615,638 B1 * | 9/2003 | Lochner et al. | ............. | 73/1.74 |
| 6,804,985 B2 * | 10/2004 | Luchinger | ................... | 73/1.74 |
| 7,250,577 B2 * | 7/2007 | Schilling et al. | .............. | 177/1 |

(Continued)

FOREIGN PATENT DOCUMENTS

DE  29912867 U1  5/2000

(Continued)

OTHER PUBLICATIONS

EP 07006664, PCT Search Report, Sep. 12, 2007.

*Primary Examiner*—Randy W Gibson
(74) *Attorney, Agent, or Firm*—Olga Kay; Rhea Nersesian; Charles M. Doyle

(57) ABSTRACT

A device for the gravimetric volume determination of liquid volumes. The device comprises a housing (11) having the shape and dimensions of a standard rack used in a clinical diagnostic analyzer system for holding sample or reagent containers, and the following components contained in housing (11): a load cell (12) for gravimetric volume determination, a weighing container (13) for receiving a liquid to be weighed with said load cell (12), a windbreak (14) which shields said weighing container (13) from air flow, an evaporation trap (15) which prevents evaporation of liquid loaded into said weighing container (13), a temperature sensor (21), an air-pressure sensor (31) and a humidity sensor (41) for sensing temperature, air pressure and humidity respectively at predetermined points within said housing (11), and an electronic processing unit for processing electrical output signals delivered by said load cell (12) and by said sensors (21, 31, 41).

9 Claims, 2 Drawing Sheets

U.S. PATENT DOCUMENTS

| | | |
|---|---|---|
| 7,282,372 B2 * | 10/2007 | VanBrunt et al. ............ 436/180 |
| 2008/0257039 A1 * | 10/2008 | Thiel et al. ................ 73/382 R |
| 2010/0114507 A1 * | 5/2010 | Bachmann et al. ........... 702/55 |

FOREIGN PATENT DOCUMENTS

| | | | |
|---|---|---|---|
| EP | 1099941 | A1 | 5/2001 |
| EP | 1406071 | A2 | 10/2003 |
| EP | 1406071 | A3 | 10/2003 |
| EP | 1099941 | B1 | 8/2005 |
| JP | 2008-292463 | A * | 12/2008 |
| WO | WO 02/03449 | A2 | 1/2002 |
| WO | WO 02/03449 | A3 | 1/2002 |

\* cited by examiner

DEVICE AND METHOD FOR THE GRAVIMETRIC DETERMINATION OF LIQUID VOLUMES AND ANALYZER SYSTEM COMPRISING SUCH A DEVICE

CROSS-REFERENCES TO RELATED APPLICATIONS

The present application claims the benefit of EP Appl. No. 07006664.2 filed Mar. 30, 2007, the entire contents of which are hereby incorporated by reference in its entirety.

FIELD OF THE INVENTION

The invention concerns a device and a method for the gravimetric determination of liquid volumes. The invention further concerns an analyzer system comprising a device of the above mentioned kind.

BACKGROUND OF THE INVENTION

In the field of clinical and molecular chemistry, analyses are often automated using in clinical diagnostic analyzer systems like clinical chemistry analyzer systems and molecular clinical diagnostic analyzer systems. For these systems, it is necessary to measure very small liquid volumes in the microliter and even in the nanoliter range with sufficient accuracy, e.g. for calibrating automatic pipetting devices which are integral parts of analyzer systems of the above mentioned kinds. For this purpose a gravimetric volume determination is a preferred method. Conventional methods of this kind require a lot of manual handling and are therefore time consuming. This is so, in particular because the various apparatuses needed for performing gravimetric volume determination are not part of an automated clinical diagnostic analyzer system. For instance, in the case of a conventional gravimetric volume determination, each liquid volume to be weighed is manually pipetted into a weighing container of a special weighing instrument, and the control of the procedure and evaluation of results for the gravimetric volume determination are carried out by a computer connected with the weighing instrument. To convert the weighing result to the volume to be determined, the ambient temperature, air pressure and humidity data must be manually entered into the computer before performing a calibration of an automatic pipetting device of an analyzer system. The ambient temperature, air pressure and humidity data may vary over a relatively wide range, depending on the specific environmental conditions at the place where the analyzer system is located. Moreover, since the location and environment of the analyzer system may be changed from time to time, it cannot be assumed that the temperature, air pressure and humidity data have stable values.

A further drawback of conventional means for performing gravimetric volume determinations is that the required additional apparatuses must be located near the analyzer apparatus and therefore increase the size of the space required for operation of the analyzer. Moreover, the size of additional conventional apparatuses required for performing gravimetric volume determinations is such that they cannot be located within the analyzer apparatus.

Moreover, quality control in the manufacture of clinical diagnostic analyzer systems and field tests of such systems require a large number of gravimetric volume determinations for the above mentioned calibration purposes. In addition, periodic calibrations of automatic pipetting devices have to be performed by gravimetric volume determinations for analyzer systems which are already installed and in operation.

BRIEF DESCRIPTION OF THE FIGURES

The subject invention will now be described in terms of its preferred embodiments with reference to the accompanying drawing. These embodiments are set forth to aid the understanding of the invention, but are not to be construed as limiting.

SUMMARY OF THE INVENTION

Figure 1:
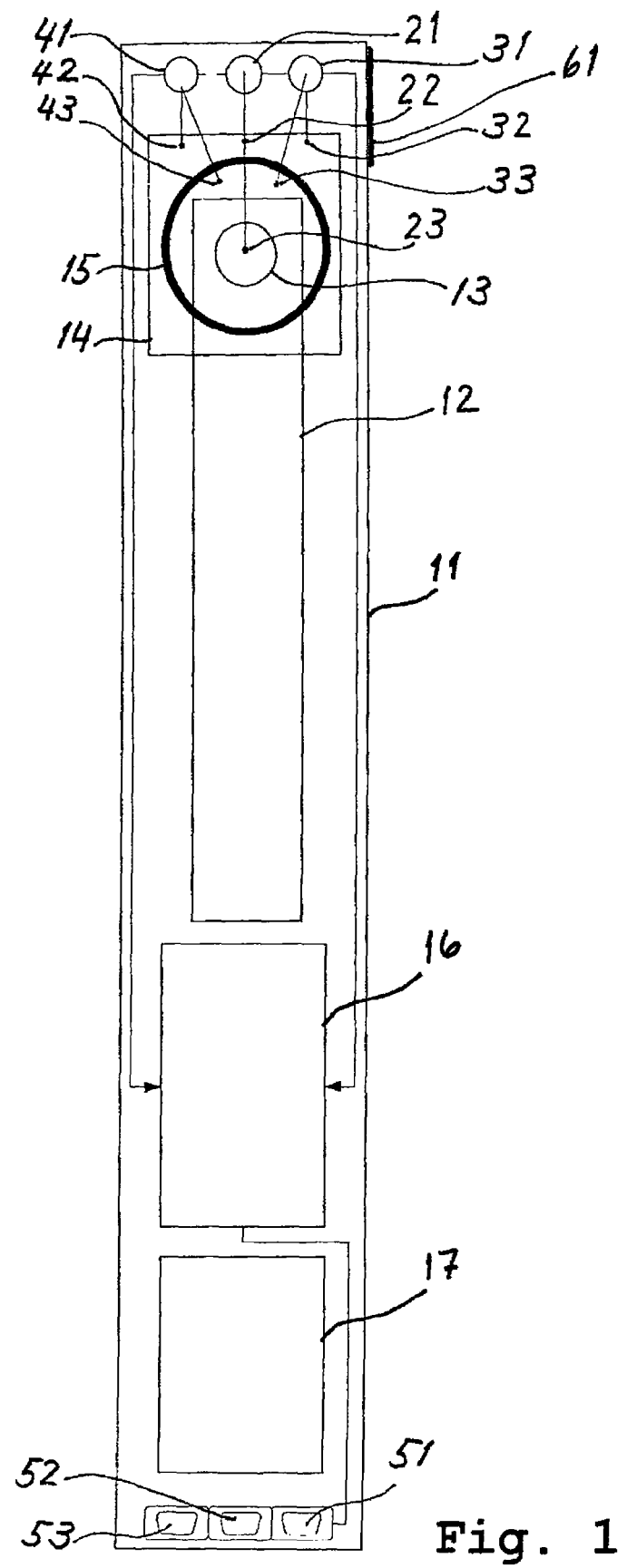
FIG. 1 shows a schematic top plan view of an embodiment of a device according to the invention.

In one aspect, there is provided a device for the gravimetric determination of liquid volumes, comprising a housing (11) having the shape and dimensions of a standard rack used in a clinical diagnostic analyzer system for holding sample or reagent containers, the following components being contained in the housing (11): a load cell (12) for gravimetric volume determination, a weighing container (13) for receiving a liquid to be weighed with the load cell (12), a windbreak (14) which shields the weighing container (13) from air flow, an evaporation trap (15) which prevents evaporation of liquid loaded into the weighing container (13), a temperature sensor (21), an air-pressure sensor (31) and a humidity sensor (41) for sensing temperature, air pressure and humidity respectively at predetermined points within the housing (11), and an electronic processing unit (16) for processing electrical output signals delivered by the load cell (12) and by the sensors (21, 31, 41).

In another aspect, there is provided a method for the gravimetric determination of liquid volumes with a device according to claim 1, the method comprising (a) introducing a liquid sample to be weighed into the load cell (12) and transmitting an output signal generated by the load cell (12) to the electronic processing unit (16), the output signal being representative of the weight of the sample, (b) measuring temperature of the environment of load cell (12) with the temperature sensor (21) and transmitting an output signal generated by this sensor to the electronic processing unit (16), (c) measuring air pressure of the environment of load cell (12) with the air-pressure sensor (31) and transmitting an output signal generated by this sensor to the electronic processing unit (16), (d) measuring humidity of the environment of load cell (12) with a humidity sensor (41) and transmitting an output signal generated by this sensor to the electronic processing unit (16), and (e) processing in the electronic processing unit (16) the output signals generated according to steps (a) to (d), the processing including the calculation of the volume of the liquid sample which corresponds to the weight of the liquid sample measured with load cell (12) to provide a value for a liquid volume outputting the signal to a user accessible device.

In another aspect, there is provided a clinical diagnostic analyzer system comprising a device for the gravimetric volume determination of liquid volumes comprising a housing (11) having the shape and dimensions of a standard rack used in a clinical diagnostic analyzer system for holding sample or reagent containers, the following components being contained in the housing (11): a load cell (12) for gravimetric volume determination, a weighing container (13) for receiving a liquid to be weighed with the load cell (12), a windbreak (14) which shields the weighing container (13) from air flow, an evaporation trap (15) which prevents evaporation of liquid loaded into the weighing container (13), a temperature sensor (21), an air-pressure sensor (31) and a humidity sensor (41) for sensing temperature, air pressure and humidity respectively at predetermined points within the housing (11), and an electronic processing unit (16) for processing electrical output signals delivered by the load cell (12) and by the sensors (21, 31, 41).

The main advantage obtained with a device according to the invention is that such a device is adapted for being incorporated into existing or future clinical diagnostic analyzers. The device according to the invention is a built-in component of an analyzer apparatus. A device according to the invention thus integrates the technical means necessary for performing reliable gravimetric volume determinations into existing and future automatic clinical diagnostic analyzer systems. The time and work required for performing reliable calibration of an automatic pipetting device by gravimetric volume determinations in such analyzers is substantially reduced. This is made possible because all above mentioned manual steps of the conventional method for performing gravimetric volume determinations are carried out automatically, e.g. the pipetting of liquids into the weighing container is carried out with the automatic pipetting device of the analyzer, and the necessary temperature, air pressure and humidity data is obtained by sensors which are part of the device according to the invention, and such data is directly transmitted to an electronic unit for data processing, which is also part of the device according to the invention. Consequently, gravimetric volume determinations in a clinical diagnostic analyzer system are carried out automatically with a minimum of manual work required. The efficiency of existing clinical diagnostic analyzer systems is improved, because the delays caused by slowly performed, conventional gravimetric volume determinations are eliminated. Moreover the incorporation of the device disclosed herein into a clinical diagnostic analyzer system protects the delicate equipment used for gravimetric volume determinations from external disturbances, and therefore more reliable measurement results are obtained.

DETAILED DESCRIPTION OF THE INVENTION

Certain embodiments of a device and a method for the gravimetric volume determination of liquid volumes in a clinical diagnostic analyzer system, as well as a clinical diagnostic analyzer comprising such a device and/or performing such a method are described hereinafter.

The structure chosen for one embodiment of the device disclosed herein is based on the fact that each model of a clinical analyzer system has at least one standard rack for holding sample or reagent containers. This rack has a specified shape and dimensions, and the system includes areas for receiving at least one such rack.

Figure 2:
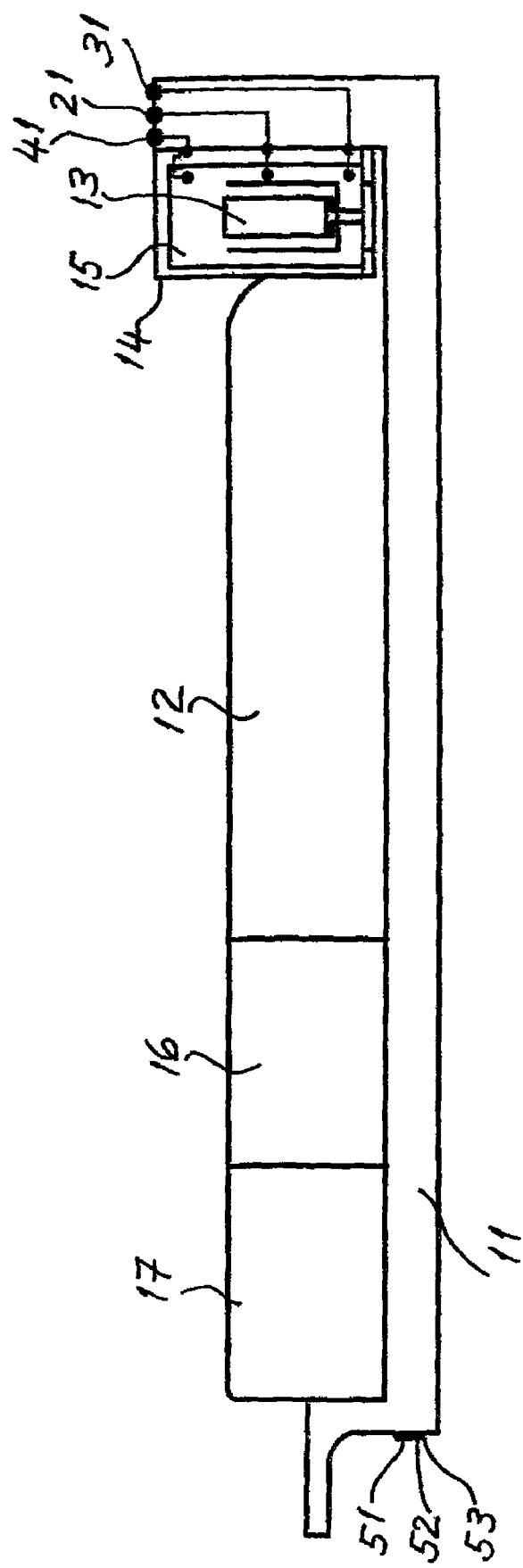
FIG. 2 shows a schematic cross-sectional view along the length symmetry axis of the embodiment shown by FIG. 1.

As shown by FIGS. 1 and 2 such a device comprises a housing 11 having the same shape and dimensions as a standard rack used in the target clinical diagnostic analyzer system for holding sample or reagent containers. In certain embodiments, the dimensions of housing 11 do not exceed the following values: length=415 millimeter, width=36 millimeter and heigth=90 millimeter. The structure of the device according to the invention thus makes possible to accommodate all components required for performing gravimetric volume determinations in a much reduced space, which is much smaller than the space occupied by conventional apparatuses for that purpose.

As shown by FIGS. 1 and 2 the following components are contained in housing 11:

a) a load cell 12 (also called a weighing cell) for gravimetric volume determination, b) a weighing container 13 for receiving a liquid to be weighed with load cell 12, c) a windbreak 14 which shields weighing container 13 from air flow, d) an evaporation trap 15 which prevents evaporation of liquid loaded into weighing container 13, e) a temperature sensor 21, an air-pressure sensor 31 and a humidity sensor 41 for sensing temperature, air pressure and humidity, respectively, at predetermined points within housing 11, and f) an electronic processing unit 16 for processing electrical signals delivered by load cell 12 and by sensors 21, 31, 41, and outputting a value, e.g. a reference weight and/or volume values to a user.

Electronic processing unit 16 may have USB-, Bluetooth and/or RS-232 interface connections.

The device shown by FIGS. 1 and 2 includes all necessary electrical connections connecting load cell 12 and sensors 21, 31, 41 to electronic processing unit 16, but these connections are not shown in FIGS. 1 and 2.

In certain embodiments, load cell 12 may be a 5-digit digital load cell for weights in the range from 0 to 5 grams. Such a load cell is suitable for gravimetric volume determinations in the nanoliter and microliter range.

In another embodiment, temperature sensor 21 comprises a sensor element 22 for sensing the temperature of weighing container 13. In another embodiment, temperature sensor 21 comprises a sensor element 23 for sensing the temperature within windbreak 14. In another embodiment, temperature sensor 21 comprises both sensor element 22 and sensor element 23.

In another embodiment, air-pressure sensor 31 comprises a sensor element 32 for sensing air pressure within windbreak 14. In another embodiment, air-pressure sensor 31 comprises a sensor element 33 for sensing air pressure within evaporation trap 15. In another embodiment, air-pressure sensor 31 comprises both sensor element 32 and sensor element 33.

In another embodiment, humidity sensor 41 comprises a sensor element 42 for sensing humidity within windbreak 14. In another embodiment, humidity sensor 41 comprises a sensor element 43 for sensing humidity within evaporation trap 15. In another embodiment, humidity sensor 41 comprises both sensor element 42 and sensor element 43.

In another embodiment housing 11 further contains a rechargeable battery 17 for supplying electrical energy required for operating load cell 12 and electronic processing unit 16.

Another embodiment further comprises an identification barcode label 61 attached to the outer surface of one side of housing 11.

The operation of the device shown by FIGS. 1 and 2 is essentially as follows. This device is positioned in the clinical diagnostic analyzer system in a location similar as the one provided therein for receiving a rack for samples or a rack for reagents. An amount of a liquid the volume of which is to be determined is pipetted into weighing container 13 automatically with the automatic pipetting device of the analyzer. After the weighing step is done the liquid is removed from weighing container 13 by the same automatic pipetting device. Electrical output signals representative of the temperature, air pressure and humidity data obtained with sensors 21, 31, 41 respectively as well as the output signal representative of the weighing result obtained with load cell 12 are each directly transmitted to electronic processing unit 16.

Electronic processing unit 16 calculates the volume corresponding to the measured weighing result taking into account all above mentioned parameters (temperature, air pressure, humidity) and provides an output signal corresponding to the calculated volume value to the electronic data processing unit of the clinical diagnostic analyzer system. Display and/or further processing of the calculated volume value are performed by suitable means available in the clinical diagnostic analyzer system.

A method for the gravimetric determination of liquid volumes carried out with the above described device comprises the following steps:

(a) introducing a liquid sample to be weighed into the load cell 12 and transmitting an output signal generated by the load cell 12 to the electronic processing unit 16, said output signal being representative of the weight of said sample, (b) measuring a temperature of the environment of load cell 12 with the temperature sensor 21 and transmitting an output signal generated by this sensor to the electronic processing unit 16, (c) measuring an air pressure of the environment of load cell 12 with the air-pressure sensor 31 and transmitting an output signal generated by this sensor to the electronic processing unit 16, (d) measuring humidity of the environment of load cell 12 with humidity sensor 41 and transmitting an output signal generated by this sensor to the electronic processing unit 16, (e) processing in the electronic processing unit 16 the output signals generated according to steps (a) to (d), said processing including the calculation of the volume of the liquid sample which corresponds to the weight of the liquid sample measured with load cell 12.

In one embodiment the introduction of a liquid sample in step (a) comprises (a1) aspirating a liquid sample to be weighed with an automatic pipetting device in a clinical diagnostic analyzer, and (a2) delivering the sample to the load cell 12 with the pipetting device.

Another embodiment of a method according to the invention comprises the following additional steps:

(1) acclimatization of the load cell 12, (i.e., maintaining the load cell 12 in the environment for a sufficient period of time for the influence of load cell 12 on the measured values for temperature, air pressure and humidity to be eliminated).

(2) evaluating the measured values of the temperature, air pressure and humidity of the environment of load cell 12, (3) filling the evaporation trap 15 with a liquid, (4) filling the weighing container with a calibrator liquid, (5) measuring and evaluating the temperature, air pressure and humidity within the interior of windbreak 14, (6) calculating and evaluating the evaporation rate per time interval, (7) starting the measurement when the conditions (including temperature, air pressure and humidity) are within acceptable limits, (8) pipetting from or into the weighing container, (9) simultaneously recording all measured values (weight, temperature, etc.),

(10) computing the result (optionally in real time):

Volume=(weight)*density coefficient.

An example of a diagnostic analyzer system in which a device according to the invention is used comprises at least one standard rack for receiving sample and/or reagent containers and an area for receiving at least one such rack. Since the device according to the invention has a housing which has the same shape and dimensions as the sample and/or reagent rack of the analyzer, the device according to the invention is adapted for being installed in the analyzer at a location otherwise available for a standard sample and/or reagent rack of the analyzer.

The following are some examples of advantages of a method and a device according to the invention:

Disposable-free verification of pipetted volumes with discretionary repetition rate or any repetition rate.

Execution of automatic calibration procedures for the verification of the accuracy of volumes pipetted with instruments being used in their normal location.

Fully or partially automated determination of pipetting parameters.

Study of the pipetting behavior of different liquids.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A device for the gravimetric determination of liquid volumes, comprising:

a) a housing (11) having the shape and dimensions of a standard rack used in a clinical diagnostic analyzer system for holding sample or reagent containers, the following components being contained in said housing (11): a load cell (12) for gravimetric volume determination, a weighing container (13) for receiving a liquid to be weighed with said load cell (12), a windbreak (14) which shields said weighing container (13) from air flow, an evaporation trap enclosure (15) which prevents evaporation of liquid loaded into said weighing container (13), a temperature sensor (21), an air-pressure sensor (31) and a humidity sensor (41) for sensing temperature, air pressure and humidity respectively at predetermined points within said housing (11), and an electronic processing unit (16) for processing electrical output signals delivered by said load cell (12) and by said sensors (21, 31, 41).

2. A device according to claim 1, wherein said load cell (12) is a digital load cell for gravimetric volume determination.

3. A device according to claim 1, wherein said temperature sensor (21) comprises a sensor element (22) for sensing temperature of said weighing container (13) and a sensor element (23) for sensing temperature within said windbreak (14), said air-pressure sensor (31) comprising a sensor element (32) for sensing air pressure within said windbreak (14) and a sensor element (33) for sensing air pressure within said evaporation trap (15), and said humidity sensor (41) comprising a sensor element (42) for sensing humidity within said windbreak (14) and a sensor element (43) for sensing humidity within said evaporation trap (15).

4. A device according to claim 1, in said housing (11) further comprising a battery (17) for supplying electrical energy required for operating said load cell (12) and said electronic processing unit (16).

5. A device according to claim 1, further comprising an identification barcode label (61) attached to the outer surface of one side of said housing (11).

6. A device according to claim 1, wherein the dimensions of said housing (11) do not exceed the following values: length=415 millimeter, width=36 millimeter and height=90 millimeter.

7. A method for the gravimetric determination of liquid volumes with a device according to claim 1, said method comprising:
- (a) introducing a liquid sample to be weighed into the load cell (12) and transmitting an output signal generated by the load cell (12) to the electronic processing unit (16), said output signal being representative of the weight of said sample,
- (b) measuring temperature of the environment of load cell (12) with the temperature sensor (21), and transmitting an output signal generated by this sensor to the electronic processing unit (16),
- (c) measuring air pressure of the environment of load cell (12) with the air-pressure sensor (31) and transmitting an output signal generated by this sensor to the electronic processing unit (16),
- (d) measuring humidity of the environment of load cell (12) with a humidity sensor (41) and transmitting an output signal generated by this sensor to the electronic processing unit (16), and
- (e) processing in the electronic processing unit (16) the output signals generated according to steps (a) to (d), said processing including the calculation of the volume of the liquid sample which corresponds to the weight of the liquid sample measured with load cell (12) to provide a value for a liquid volume outputting said signal to a user accessible device.

8. A method according to claim 7, wherein said step of introducing a liquid sample in step (a) comprises
- (a1) aspirating a liquid sample to be weighed with an automatic pipetting device in a clinical diagnostic analyzer, and
- (a2) delivering said sample to said load cell with said pipetting device.

9. A clinical diagnostic analyzer system comprising a device for the gravimetric volume determination of liquid volumes according to claim 1.

* * * * *